Jan. 3, 1961   H. R. MARKAU   2,966,772
FOOD PACKAGING APPARATUS
Filed Feb. 5, 1959   5 Sheets-Sheet 1

INVENTOR.
HARRY R. MARKAU
BY
Dike, Thompson & Bronstein
ATTORNEYS

INVENTOR.
HARRY R. MARKAU
BY
*Dike, Thompson & Bronstein*
ATTORNEYS

Jan. 3, 1961  H. R. MARKAU  2,966,772
FOOD PACKAGING APPARATUS
Filed Feb. 5, 1959  5 Sheets-Sheet 3

INVENTOR.
HARRY R. MARKAU
BY
Dike, Thompson & Bronstein
ATTORNEYS

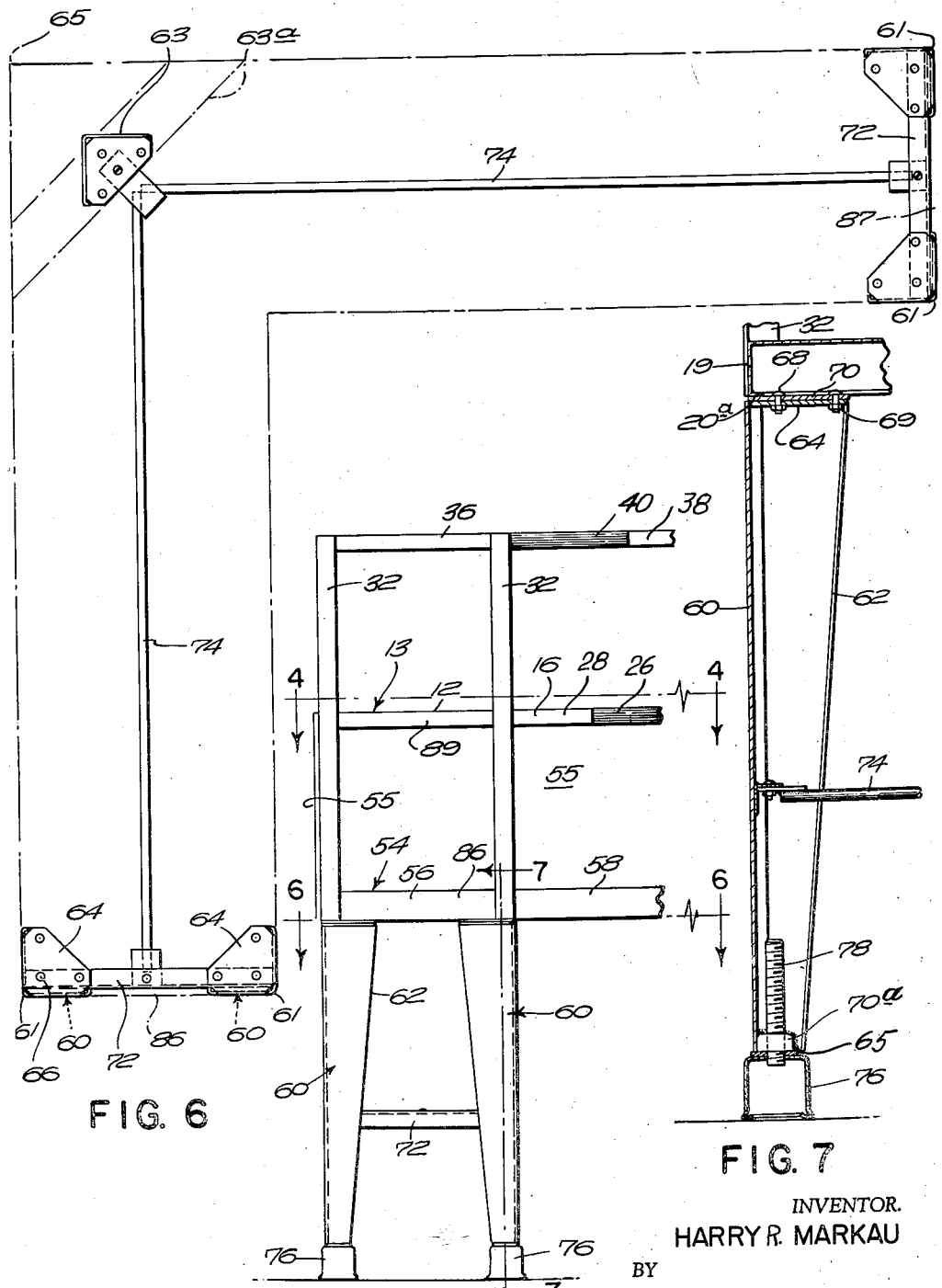

Jan. 3, 1961  H. R. MARKAU  2,966,772
FOOD PACKAGING APPARATUS
Filed Feb. 5, 1959  5 Sheets-Sheet 5

INVENTOR.
HARRY R. MARKAU
BY
*Dike, Thompson & Bronstein*
ATTORNEYS

United States Patent Office 2,966,772
Patented Jan. 3, 1961

2,966,772
FOOD PACKAGING APPARATUS

Harry R. Markau, Brookline, Mass., assignor to Supermarket Metal Products, Inc., Boston, Mass., a corporation of Delaware Filed Feb. 5, 1959, Ser. No. 791,473

8 Claims. (Cl. 53—391)

The present invention relates to the preparation for packaging and packaging of foods for self-service counters in food markets. It relates especially to the cutting and packaging of meats for self-service meat counters.

Most of the large food super markets today are self-service markets in which meats, vegetables and fruits are pre-packaged, weighed, labelled with the proper price and weight and placed on or in self-service counters in the market so that the customer can select the package he desires and carry it to the cashier who rings up the price appearing on the label, totals the price of the order and receives payment.

This self-service system permits a substantially larger total volume of sales per unit of time with minimum inconvenience and waiting by customers.

However, the cost of labor to prepare, package, weigh and label the food according to present techniques is substantial. This is in part due to the fact that such techniques are relatively inefficient, i.e., production per unit of time per employee is relatively small, which in turn is due to the fact that there is a substantial amount of wasted effort, e.g. steps and other manipulations by the employees. Consequently, in order to package the large total volume of packaged foods sold by a large super market at a sufficiently rapid rate to keep the self-service counters replenished a larger number of employees are required which is expensive and which requires added working space, which in turn adds to the expense. Furthermore, an increase in the number of employees usually results in less efficiency per employee.

It is an object of the present invention to provide an apparatus for preparing for packaging, packaging, weighing and labelling food for self-service counters which apparatus reduces to a minimum the number of steps and other manipulations required by the employees.

Another object is to provide such an apparatus which increases substantially the volume of self-service food which can be packaged, weighed and labelled per unit of time per employee, whereby the cost of the individual package to the market is substantially reduced.

Another object is to provide such an apparatus which is compact and rugged in construction, which is inexpensive and simple to make and which occupies a minimum of floor space.

Yet another object is to provide such an apparatus which includes a novel food packaging table of unique design.

Another object is to provide an improved apparatus for packaging foods, especially meat, for self-service counters.

Other objects and features of the present invention will be apparent from the following description and accompanying drawings in which:

Fig. 5 is a view in elevation taken along the line 5—5 of Fig. 3.

Fig. 6 is a view taken along the line 6—6 of Fig. 5 and showing the outline of the lower shelf of the table located directly above the line 6—6.

Fig. 7 is a view taken along the line 7—7 of Fig. 5.

Figure 1:
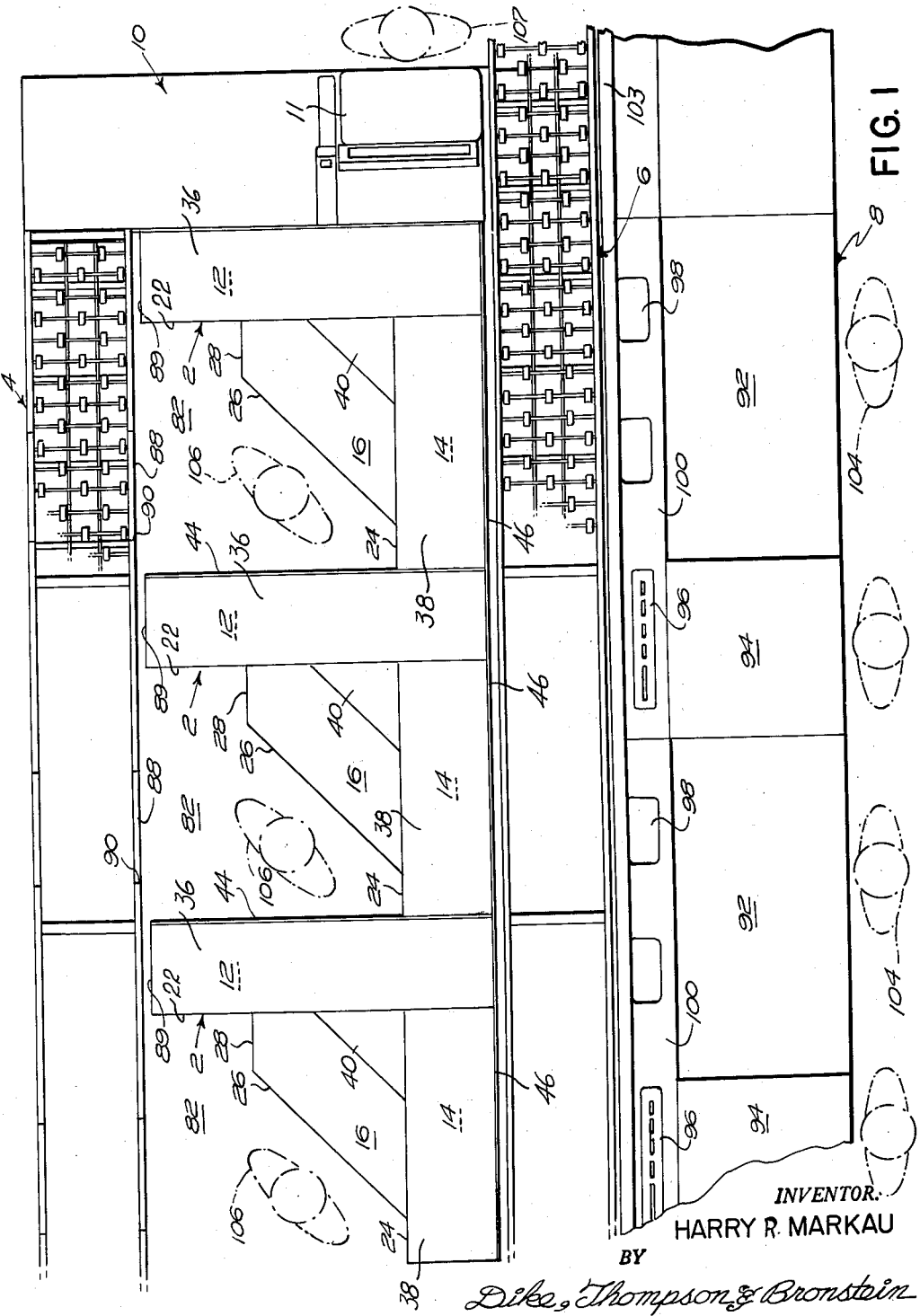
Fig. 1 is a plan view of an embodiment of the present invention.

The apparatus shown in the drawings comprises a row of novel, L-shaped sheet metal meat packaging tables 2 laid end to end, as shown, a conventional roller type conveyor 4 extending along one of the sides of the row of tables, a second conventional type roller 6 extending along the other sides of the row of tables, a meat cutting and chopping table 8 extending along the side of conveyor 6 opposite the side facing the tables 2, a weighing and labelling table 10 at one end of the row of tables 2 and at the corresponding end of the conveyor 4, which weighing and labelling table has a scale 11 thereon.

Each table 2 comprises a generally L-shaped sheet metal working table surface or portion 13 (see Fig. 2) comprising legs 12 and 14 extending at right angles to each other, as shown, and having a portion 16 projecting from the inner corner of the L where the legs 12 and 14 are joined and from the portions of the inner edges 22 and 24 of the legs 12 and 14 adjacent such corner into the space between the legs, as shown. The edges of the sheet metal forming legs 12 and 14 are turned downwardly into downwardly extending flanges 19 which in turn have an inwardly turned lip 20a (see Fig. 2). The edges of legs 12 and 14 abut against each other and are welded together at 15.

The projecting portion 16 is made up of a separate piece of sheet metal lying in the same plane as the legs 12 and 14. The edges 18 and 20 of the projecting portion abut and are welded to the inner edges 22 and 24 of legs 12 and 14 respectively so that the projecting portion and the legs form a continuous working table surface, as shown.

Projecting portion 16 has an edge 26 extending at an angle of about 45° from a portion of the inner longitudinal edge 24 of leg 14 intermediate its ends and an edge 28 extending from a portion of the inner longitudinal edge 22 of leg 12 intermediate its ends and at right angles to leg 12 and forming a corner 30 with edge 26, as shown.

Edges 26 and 28 of projecting portion 16 have downwardly extending flanges 19 and lips 20a like legs 12 and 14 but edges 18 and 20 of 16 do not.

The working table surface 13 is supported at its five outer corners by five pieces of angle iron 32 to which it is welded or bolted.

Each table has an L-shaped upper shelf 34 made of sheet metal and having legs 36 and 38 overlying the legs 12 and 14 respectively of the working table surface 13. The shelf 34 comprises two pieces of sheet metal of the same areas as legs 12 and 14 respectively welded at 35, is spaced upwardly from the table surface 13 and is attached at its five corners to the upper portions of angle iron supports 32, as shown, by welding or by bolts.

Shelf 34 has a triangular shaped wedge piece 40 two of the side edges 41 of which are welded to the portions of the inside edges of legs 36 and 38 adjacent the inside corner where the legs 36 and 38 are joined. Piece 40 overlies a part (the inner corner portion) of projection 16, as shown, and lies in the same plane as the legs 36 and 38.

The edges of shelf 34 are bent over like the edges of the table portion 13 to form flanges 19 which are turned inwardly at 20a. The edge 37 of the wedge piece 40 is also provided with such a flange and lip but the edges 41 are not.

The table portion 13 has a diagonally disposed channular shaped stiffener 42 the base 43 of which is welded to the underside of the table portion 13 and which extends diagonally in a direction substantially parallel to the edge 26 from the outer longitudinal edge 46 of leg 14 to the outer longitudinal edge 44 of leg 12, the ends of the channular stiffener 42 abutting against and being welded to the inner surfaces of flanges 19 forming the edges 44 and 46. The stiffener extends through slots 47 in the flanges 19 forming the inner edges 22 and 24 of the legs 12 and 14 respectively and is located under both legs and the projecting portion 16, as shown.

Another channular shaped stiffener 50 is also welded to the underside of projection 16 with its ends abutting against and welded to the inner wall of the flange 19 forming the edge 26 and a leg of the channular shape stiffener 42 as shown. Stiffener 50 extends at right angles to stiffener 42 and is welded to the underside of 16 by means of coplanar flanges 51 extending at right angles from the legs 53 thereof.

Leg 14 of table top 13 has a well 52 (see Fig. 4) for a hot plate which is used to seal conventional thermoplastic sheets used to wrap meat.

Each table 2 also has a lower L-shaped shelf 54 made of sheet metal and comprising legs 56 and 58 lying under and having the same shape and area as legs 12 and 14 respectively of the table portion 13. The lower shelf 54 is spaced below the table portion 13 and the corners thereof are also welded or bolted to the lower end portions of the angle iron strips 32.

Sheets of metal 55 are welded to the outer longitudinal edges of legs 12 and 14 of the table surface 13, to the outer longitudinal edges of legs 56 and 58 of the lower shelf 54 and to the pieces of angle iron 32 between such edges of the table surface and lower shelf to provide rear walls between the table portion 13 and the lower shelf 54 as shown. One rear wall 55 extends from the outer edge 46 of the table portion downwardly to the corresponding edge of the lower shelf and another rear wall 55 extends from the edge 44 of the table portion downwardly to the corresponding edge of the lower shelf, as shown.

Figure 2:
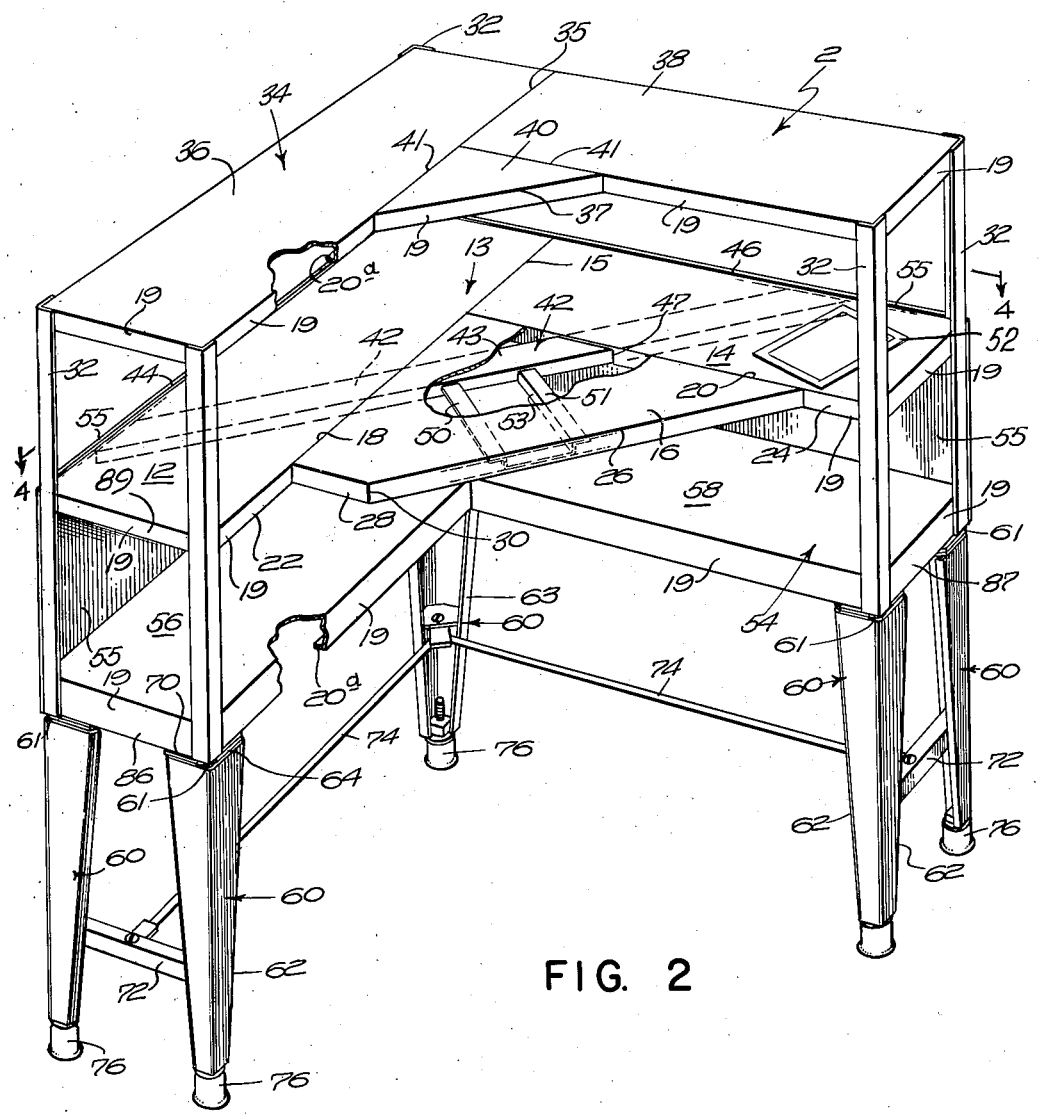
Fig. 2 is a view in perspective of one of the packaging tables of Fig. 1 with parts cut away.
Figure 3:
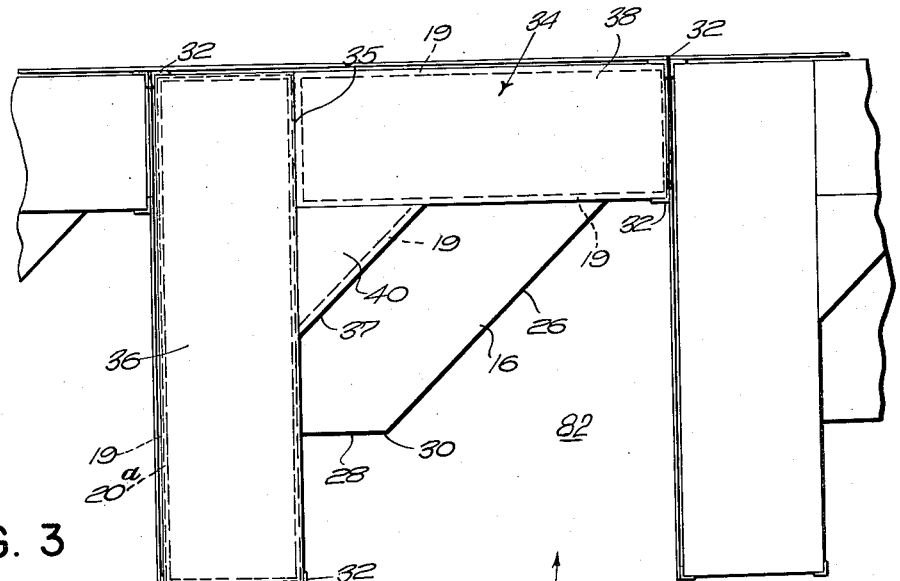
Fig. 3 is a plan view of the packaging table of Fig. 2 also showing parts of adjacent tables.

The whole assembly is supported by five legs 60 which are angular in cross sectional shape and are tapered at 62 (see Figs. 2, 5 and 7). Four of the legs 60 are attached to the underside of the assembly at the four corners 61 thereof formed by the outer ends 86 and 87 of legs 56 and 58 of the lower shelf and the fifth leg 63 (see Fig. 6) is spaced inwardly from the corner 65 of the assembly as shown in Fig. 6.

The top of each leg 60 has a gusset 64 (see Figs. 2, 6 and 7) extending thereover and welded thereto, such gusset having bolt holes 66 cooperating with bolts 68 and nuts 69 and bolt holes in a matching gusset 70 welded to the bottom of the lower shelf 54 at its corners as shown, to attach the table and shelf assembly to the supporting legs 60. Actually the gussets 70 are attached to the bottoms of the inturned lips 20a at the corners 61 of the lower shelf.

Leg 63 is attached by the same type of twin gusset and bolt construction to the underside of the mid section of a diagonally disposed cross bar 63a which is welded to the underside of the lips 20a of shelf 54, as shown in Fig. 6.

Each pair of legs 60 at the two corners 61 formed by the outer ends 86 and 87 of each of the legs 56 and 58 of the lower shelf 54 is joined by a strengthening piece of angle iron 72. Strengthening rods 74 are attached to the mid portions of pieces 72 and to the leg 63, as shown in Fig. 6.

The bottom of each angle shaped leg 60 and 63 has a plate or gusset 65 (Fig. 7) extending thereover and welded thereto which gusset has a nut 70a welded thereto for receiving a threaded shank 78 attached to the top of cup-shaped support 76. The threaded shank 78 and bolt 70 permit the height of each leg to be adjusted.

Figure 4:
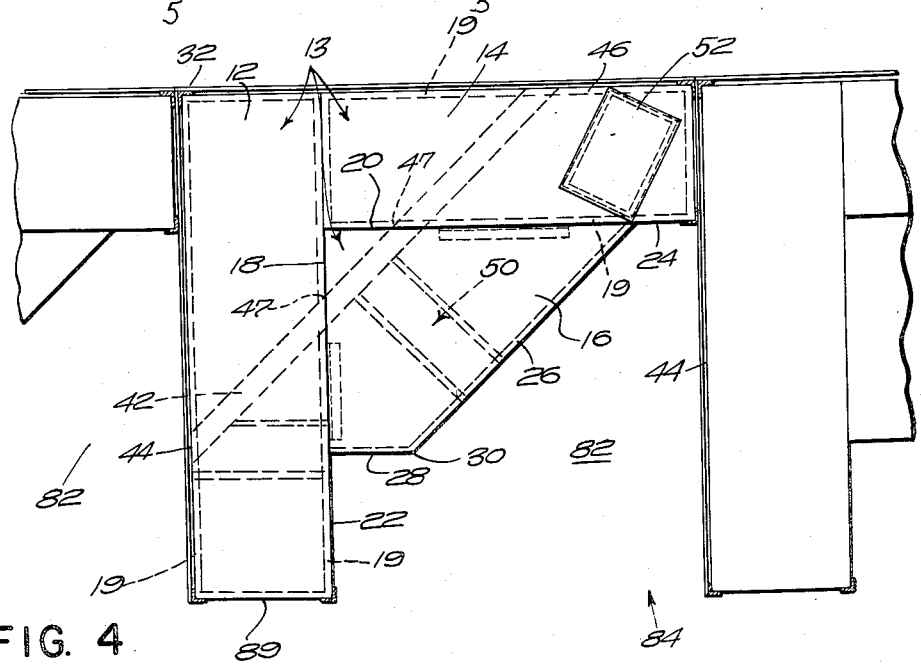
Fig. 4 is a view taken along the line 4—4 of Fig. 2 showing the top of the working surface of the packaging table of Fig. 2 and the parts of the adjacent tables shown in Fig. 3.

With reference to Figs. 1, 2 and 4, the outer longitudinal edge 44 of the leg 12 of table portion 13 of each table 2 forms with the edges 24, 26, 28 and 22 of the table portion 13 of an adjacent table 2, a space 82 bounded by said edges and open at one side 84. However, the elongated conveyor 4 (see Fig. 1) extending along the ends 89 of legs 12 of tables 2 and across the openings 84 of spaces 82 close such spaces as shown.

The conveyors 4 and 6 are at the same level as the tops of table portions 13. The portions of conveyor 4 extending across each opening 84 have gates 88 pivotally connected to the rest of the conveyor at 90 to permit packaging personnel to enter and leave the spaces 82.

Figure 8:
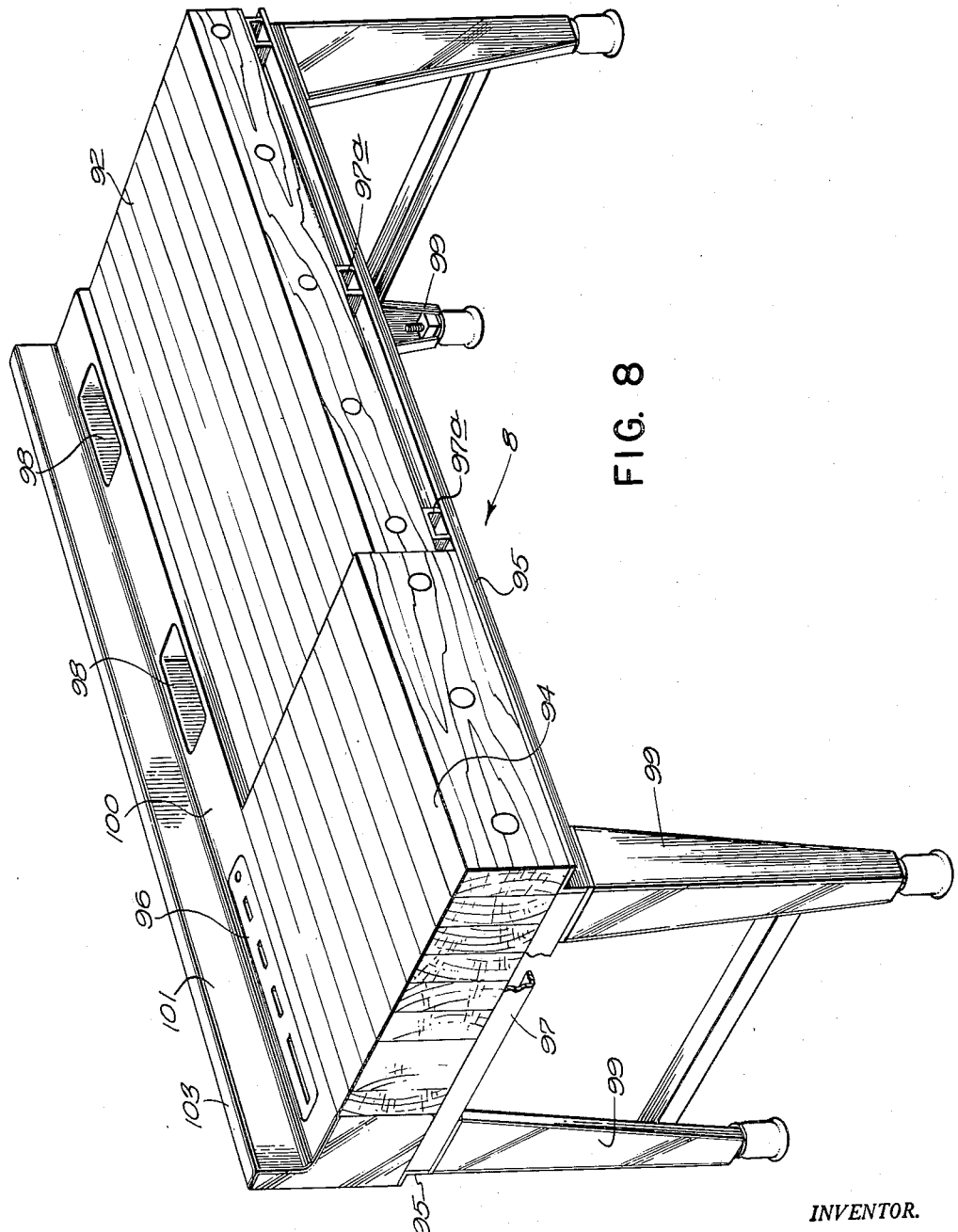
Fig. 8 is a view in perspective of the apparatus of Fig. 1 showing the food preparing table and with parts cut away and parts shown in section.

The meat cutting table 8 (see Figs. 1 and 8) extending along the side of conveyor 6 opposite from the side facing the tables 2 comprises a plurality of individual tables 8, each of which has a meat cutting slab of wood 92 and a meat chopping slab of wood 94 mounted on a metallic frame comprising two oppositely facing lengthwise pieces of angle iron 95, two channel iron cross members 97 and three channel iron cross members 97a. The two channel members 97 are located at opposite ends of the frame and are positioned on their sides as shown, with their upper legs at the same level as the tops of angle irons 95 and with their ends welded to the angle irons 95. Channels 97a are inverted and the ends thereof rest on top of and are welded to the angle irons 95 as shown. Cutting slab 92 rests on members 97a. The frame is mounted at its four corners on a plurality of legs 99 corresponding in shape to legs 60 and 63 by the same type of gusset and bolt arrangement described above with reference to legs 60 and 63.

The chopping slab 94 is substantially thicker than the cutting slab 92 but because the cutting slab is located on top of the channels 97a whereas the chopping block 94 is supported directly on the angle irons 95 and channels 97 the upper surface of cutting block 92 is only slightly lower than the upper surface of the chopping block.

The tops of the chopping and cutting blocks 94 and 92 are slightly below conveyor 6.

Each chopping and cutting table 8 is provided with knife holders 96 and waste holes 98 for meat waste. Barrels are placed under the holes 98. The holes and knife holders are located in a metallic top 100 between the meat chopping and cutting blocks and the conveyor 6.

The metallic top 100 has a wall 101 extending upwardly therefrom and then horizontally toward the conveyor 6 at 103, the portion 103 being level with the top of conveyor 6.

The weighing and labelling table 10 is provided with the scale 11 for weighing the packaged meat and labels for labelling the same with the weight and price.

The spaces 82 are large enough for packaging personnel (designated as 106 in Fig. 1) to stand in and package the meat.

The width of the conveyor 6 and the meat cutting and chopping table 8 and the design of the table portions 13 are such that the meat cutters designated as 104 in Fig. 1 can continuously for a period of hours cut and chop meat and place the cut meat on the conveyor 6 and the meat packaging personnel 106 can continuously remove the meat from the conveyor 6, package it on the projecting portions 16 and place it on the conveyor 4 by means of which it is conveyed to the weighing table 10 where the weighing and labelling personnel 107 (see Fig. 1) can weigh it and label it without the necessity of any of such personnel taking a single step.

Furthermore, the apparatus is compact in design and occupies a minimum of floor space.

The peculiar design of the table portions 13 and consequently the spaces 82 provides enough table space for packaging the meat and enough room for the packaging personnel to work efficiently and yet gives the packaging personnel easy access to the conveyor 6 and the conveyor 4 with a minimum of manipulation and wasted effort. Furthermore, the weighing personnel can continuously pick up the packages and weigh and label them without taking a single step and with a minimum of effort and manipulation.

The peculiar design of the tables permits the above and yet provides adequate space for storage of equipment and supplies used by the packaging personnel. For example, the plastic sheets for packaging can be stored on top of the top shelf and other supplies can be stored on the bottom shelf within easy reach of the packaging personnel. Furthermore, enough room is provided for the heating plate and to manipulate the heating iron.

With the use of the apparatus of the present invention, the number of packages which can be produced per unit of time per employee is substantially increased so that a given volume can be produced with less personnel and at less expense.

So long as the cutters are supplied with uncut meat and the packaged meat is carried away from the weighing table by other employees, none of the personnel shown in Fig. 1 have to take a single step or make any wasted movements.

The only personnel who have to take any steps at all are those who supply the uncut meat to the cutters, those who transport the packaged meat to the self-service counters and those who replenish the supply of packaging and labelling material.

I claim:

1. An apparatus for preparing and packaging food comprising a row of food packaging tables having generally L-shaped table surfaces and laid end to end with the longitudinal outer edge of one leg of each table surface lying adjacent the end of the other leg of the adjacent table surface and forming with the legs of said adjacent table surface a space for a person to stand, said space having an open side, the inner corner of the L of each table surface formed by the juncture of the legs and the inner edges of the legs adjacent said corner having a portion projecting into the space between the two legs, the spaces formed by said adjacent tables being separated from each other by said one leg of said tables, first conveyor means extending along and adjacent to the ends of said one legs and across the open sides of said spaces, second conveyor means extending along and adjacent to the longitudinal outer edges of said other legs of said tables, a table for preparing food for packaging, said food preparing table extending along the side of said second conveyor means opposite the side facing said longitudinal edges of said other legs.

2. An apparatus according to claim 1, said food preparing table being of a width which permits food preparing personnel standing along the side of said food preparing table opposite from the side facing said second conveyor means to deposit prepared food for packaging onto said second conveyor means without taking any steps, said other legs being of a width which permits food packaging personnel standing in said spaces to remove the prepared food from said second conveyor means, whereby food prepared at said food preparing table by said food preparing personnel can be placed on said second conveyor means, can be removed from the second conveyor means by packaging personnel standing in said spaces, can be packaged by said last mentioned personnel on said projecting portions of said packaging tables, can be placed on said first conveyor means by said packaging personnel after it has been packaged and can be conveyed by said first conveyor means without the necessity of said food preparing personnel and said food packaging personnel taking any steps.

3. An apparatus according to claim 2, a weighing and labelling table at an end of said row of tables and adjacent an end of said first conveyor means, whereby packaged food placed on said first conveyor means by said packaging personnel can be conveyed by said first conveyor means to said weighing and labelling table and can be removed from said first conveyor means, weighed and labelled with the correct prices by the weighing personnel at said weighing table without the necessity of said packaging and weighing personnel taking any steps.

4. An apparatus according to claim 3, said first conveyor means having gates for permitting said packaging personnel to enter and leave said spaces.

5. An apparatus according to claim 3, said projecting portion having an edge extending at an angle to said legs.

6. An apparatus according to claim 5, one end of said edge of said projecting portion extending to the inner longitudinal edge of one of said legs intermediate its ends and the other end extending into an edge portion of said projecting portion which is substantially parallel to said last mentioned one leg, said last mentioned edge portion extending to the inner longitudinal edge of the other leg intermediate its ends.

7. An apparatus according to claim 4, said legs of said L-shaped table surface having an L-shaped shelf located thereover and spaced upwardly therefrom, said projecting portion projecting laterally into said space between said legs of said L-shaped table portion beyond said shelf, whereby said projecting portion is exposed for packaging food thereon.

8. An apparatus according to claim 7, said tables being supported by a plurality of supporting legs and having an L-shaped lower shelf of substantially the same shape as said upper shelf but spaced below the L-shaped table surface, each of said tables being provided with a receptacle for a hot plate, said receptacle being located at an end portion of one of the legs of said table.

References Cited in the file of this patent

UNITED STATES PATENTS

| | | |
|---|---|---|
| 1,270,501 | Dohm | June 25, 1918 |
| 1,380,518 | Bellig | June 7, 1921 |
| 1,770,500 | Wege | July 15, 1930 |
| 2,158,467 | Madsen | May 16, 1939 |
| 2,280,094 | Madsen | Apr. 21, 1942 |
| 2,759,779 | Bergman | Aug. 21, 1956 |
| 2,851,840 | Deppner | Sept. 16, 1958 |

FOREIGN PATENTS

| | | |
|---|---|---|
| 287,326 | Germany | Sept. 20, 1915 |